United States Patent
Degner et al.

(10) Patent No.: US 9,960,726 B1
(45) Date of Patent: May 1, 2018

(54) ELECTRIC DRIVE POWER CONVERTER WITH LOW DISTORTION DEAD-TIME INSERTION

(71) Applicant: Ford Global Technologies, LLC, Dearborn, MI (US)

(72) Inventors: Michael W. Degner, Novi, MI (US); Chingchi Chen, Ann Arbor, MI (US); Jun Kikuchi, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days. days.

(21) Appl. No.: 15/605,044

(22) Filed: May 25, 2017

(51) Int. Cl.
| | |
|---|---|
| H02P 27/08 | (2006.01) |
| B60L 11/18 | (2006.01) |
| H02M 7/537 | (2006.01) |
| H02M 1/084 | (2006.01) |
| H02M 1/00 | (2006.01) |

(52) U.S. Cl.
CPC .......... H02P 27/08 (2013.01); B60L 11/1879 (2013.01); H02M 1/084 (2013.01); H02M 7/537 (2013.01); B60L 2210/10 (2013.01); B60Y 2200/91 (2013.01); B60Y 2200/92 (2013.01); H02M 2001/0009 (2013.01)

(58) Field of Classification Search
CPC ...... H02P 27/08; H02M 1/084; B60L 11/1879
USPC ......................................................... 318/503
See application file for complete search history.

(56) References Cited

U.S. PATENT DOCUMENTS

| | | | | |
|---|---|---|---|---|
| 5,838,134 | A | * 11/1998 | Cummins | ............... H02P 25/04 318/400.11 |
| 6,678,180 | B2 | 1/2004 | Matsuda | |
| 7,286,375 | B1 | * 10/2007 | Welchko | ........... H02M 7/53803 363/132 |
| 7,659,679 | B2 | * 2/2010 | Raja | ....................... B62D 5/046 318/484 |

(Continued)

FOREIGN PATENT DOCUMENTS

| | | |
|---|---|---|
| JP | H0947028 A | 2/1997 |
| JP | 2010016937 A | 1/2010 |

(Continued)

OTHER PUBLICATIONS

Lihua Chen et al., Dead-Time Elimination for Voltage Source Inverters, IEEE Transactions on Power Electronics, vol. 23, No. 2, Mar. 2008.

*Primary Examiner* — Kawing Chan
(74) *Attorney, Agent, or Firm* — David B. Kelley; MacMillan, Sobanski & Todd, LLC

(57) ABSTRACT

An electric drive system of an electrified vehicle has a power converter with phase leg switching devices controlled by pulse-width modulation to supply multi-phase AC to an electric traction motor. Dead-time intervals are inserted into gate drive signals for the switching devices without introducing any significant distortion in the output of the converter. A direction of current flow between a phase leg and the motor is detected. When the current direction is positive, lower gate signals for a lower switching device in the phase leg have a delayed rising edge and an advanced falling edge while upper gate signals are unmodified. When the current direction is negative, upper gate signals for an upper switching device in the phase leg have a delayed rising edge and an advanced falling edge while lower gate signals are unmodified.

11 Claims, 6 Drawing Sheets

(56) References Cited

U.S. PATENT DOCUMENTS

| | | | |
|---|---|---|---|
| 8,760,891 B2* | 6/2014 | Lloyd | H03K 17/18 |
| | | | 363/56.04 |
| 2003/0062868 A1* | 4/2003 | Mir | H02P 6/14 |
| | | | 318/599 |
| 2005/0190005 A1* | 9/2005 | Katsuki | H02M 7/53873 |
| | | | 332/109 |
| 2009/0066384 A1* | 3/2009 | Suzuki | G06F 1/025 |
| | | | 327/184 |
| 2011/0199164 A1* | 8/2011 | Lukic | H03K 7/06 |
| | | | 332/109 |
| 2012/0206077 A1* | 8/2012 | Yoneshima | H02P 6/185 |
| | | | 318/400.33 |
| 2013/0093377 A1* | 4/2013 | Minami | H02P 27/08 |
| | | | 318/521 |
| 2016/0211772 A1 | 7/2016 | Degner et al. | |

FOREIGN PATENT DOCUMENTS

| | | |
|---|---|---|
| JP | 2014147200 A | 8/2014 |
| KR | 1020010010270 | 8/2002 |

* cited by examiner

ELECTRIC DRIVE POWER CONVERTER WITH LOW DISTORTION DEAD-TIME INSERTION

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to power converters including inverters for an electric drive system of an electrified vehicle, and, more specifically, to insertion of dead-time intervals into gate drive signals without introducing any significant distortion in the output current of the converter.

Electric vehicles, such as hybrid electric vehicles (HEVs), plug-in hybrid electric vehicles (PHEVs), and battery electric vehicles (BEVs), use inverter-driven electric machines to provide traction torque and regenerative braking torque. A typical electric drive system includes a DC power source (such as a battery pack or a fuel cell) coupled by contactor switches to a variable voltage converter (VVC) to regulate a main bus voltage across a main DC linking capacitor. An inverter is connected between the main buses for the DC link and a traction motor in order to convert the DC power to an AC power that is coupled to the windings of the motor to propel the vehicle. A second inverter may also be connected between the main bus and a generator (if present) to provide another power flow path from a prime mover, typically an internal combustion engine, to the DC link.

The inverters include transistor switching devices (such as insulated gate bipolar transistors, or IGBTs) connected in a bridge configuration including a plurality of phase legs. A typical configuration includes a three-phase motor driven by an inverter with three phase legs. An electronic controller turns the switches on and off in order to invert a DC voltage from the bus to an AC voltage applied to the motor, or to rectify an AC voltage from the generator to a DC voltage on the bus. In each case, the inverters are controlled in response to various sensed conditions including the rotational position of the electric machine(s) and the current flow in each of the phases.

The inverter for the motor may preferably pulse-width modulate the DC link voltage in order to deliver an approximation of a sinusoidal current output to drive the motor at a desired speed and torque. Pulse Width Modulation (PWM) control signals applied to the gates of the IGBTs turn them on and off as necessary so that the resulting current matches a desired current.

Because each phase leg of the inverter has a pair of upper and lower switching devices connected across the DC link, it is important that both devices not be conducting (i.e., turned-on) simultaneously. Otherwise, the resulting "shoot-through" of the phase leg could result in damage to the switching devices. A short time interval during which both the upper and lower switching devices of a phase leg are turned off, known as a dead-time, is typically used in connection with PWM control of inverters in order to prevent shoot-through. However, the insertion of a dead-time has resulted in distortion of the output current waveform delivered to the load and the introduction of control delays.

SUMMARY OF THE INVENTION

In one aspect of the invention, a power converter comprises a phase leg having an upper switching device and a lower switching device, wherein a junction between the upper and lower switching devices is configured to be coupled to a load. A current sensor for the phase leg detects a positive or negative direction of a current flow from the junction to the load. A gate driver is coupled to the phase leg activating the upper switching device according to an upper gate signal and activating the lower switching device according to a lower gate signal. A controller compares a PWM carrier signal to a commanded duty cycle signal to generate nominal upper and lower timing signals. When the positive direction of current flow is detected then the controller 1) generates a positive offset duty cycle which is greater than the commanded duty cycle by a predetermined positive offset, 2) compares the PWM carrier signal to the positive offset duty cycle signal to generate a positive offset timing signal, 3) generates the upper gate signal according to the nominal upper timing signal, and 4) generates the lower gate signal according to the logical inverse of the positive offset timing signal. When the negative direction of current flow is detected then the controller 1) generates a negative offset duty cycle which is less than the commanded duty cycle by a predetermined negative offset, 2) compares the PWM carrier signal to the negative offset duty cycle signal to generate a negative offset timing signal, 3) generates the upper gate signal according to the negative offset timing signal, and 4) generates the lower gate signal according to the nominal lower timing signal.

DETAILED DESCRIPTION OF PREFERRED EMBODIMENTS

Figure 1:
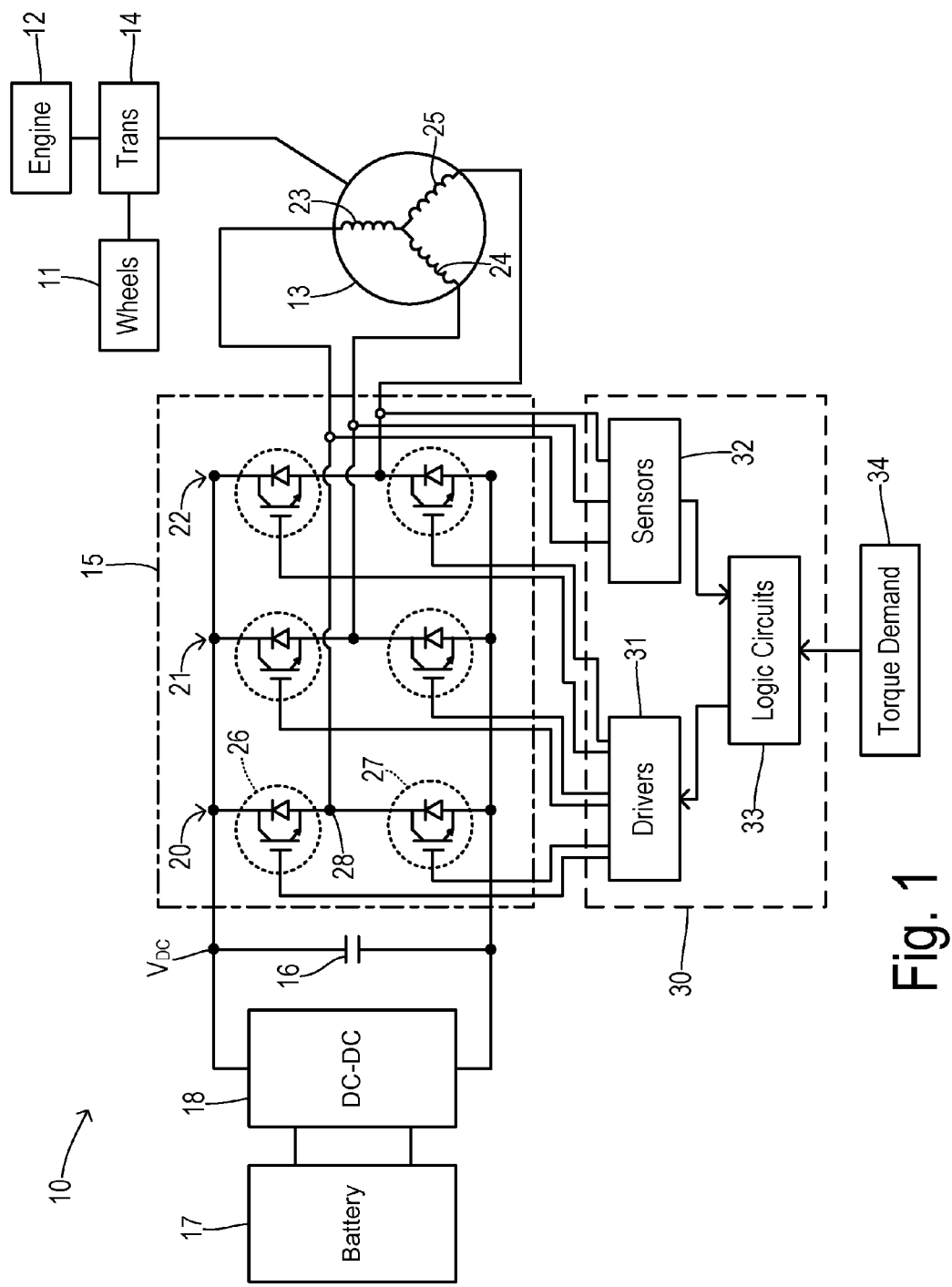
FIG. 1 is a schematic, block diagram showing a powertrain of an electrified vehicle according to one embodiment of the present invention.

FIG. 1 shows a hybrid electric vehicle 10 as one type of vehicle for implementing the dead-time insertion of the present invention. Vehicle wheels 11 may be driven by an internal combustion engine 12 and/or by a traction motor 13 via a transmission 14. For providing electric propulsion, motor 13 may be driven via an inverter 15 that receives a DC link voltage at a DC link capacitor 16. The DC link voltage may result from conversion of DC power from a battery pack 17 by a converter 18 as known in the art.

Inverter 15 includes phase legs 20, 21, and 22 coupled to motor phase windings 23, 24, and 25 in a bridge configuration. Phase leg 20 has an upper switching device 26 and a lower switching device 27 connected in series across DC link 16 and providing a junction 28 between devices 26 and 27 which is connected to winding 23 of motor 13. Phase legs 21 and 22 are similarly constructed.

The switching devices may be comprised of IGBTs, antiparallel diodes, wide band gap FETs, or other devices. Each of the upper and lower switching devices has a respective gate terminal coupled to drivers 31 in a controller 30. Current sensors 32 coupled to each of the junctions of the phase legs measure the current flow through each phase winding. Measured current magnitudes are provided from sensors 32 to logic circuits 33 in controller 30 for use in determining PWM switching signals to be applied to the switching devices by drivers 31. As known in the art, the measured current may be compared with a desired motor current as determined according to a torque demand 34 that may be derived from operator input such as an accelerator pedal so that the operator can control the vehicle speed. Thus, current feedback determines a PWM duty cycle within logic circuits 33 that is then used to generate the timing of PWM switching signals for the phase leg switching devices. Logic circuits 33 may be configured to introduce dead times in accordance with the present invention as described below in connection with FIGS. 7 and 8.

Figure 2:
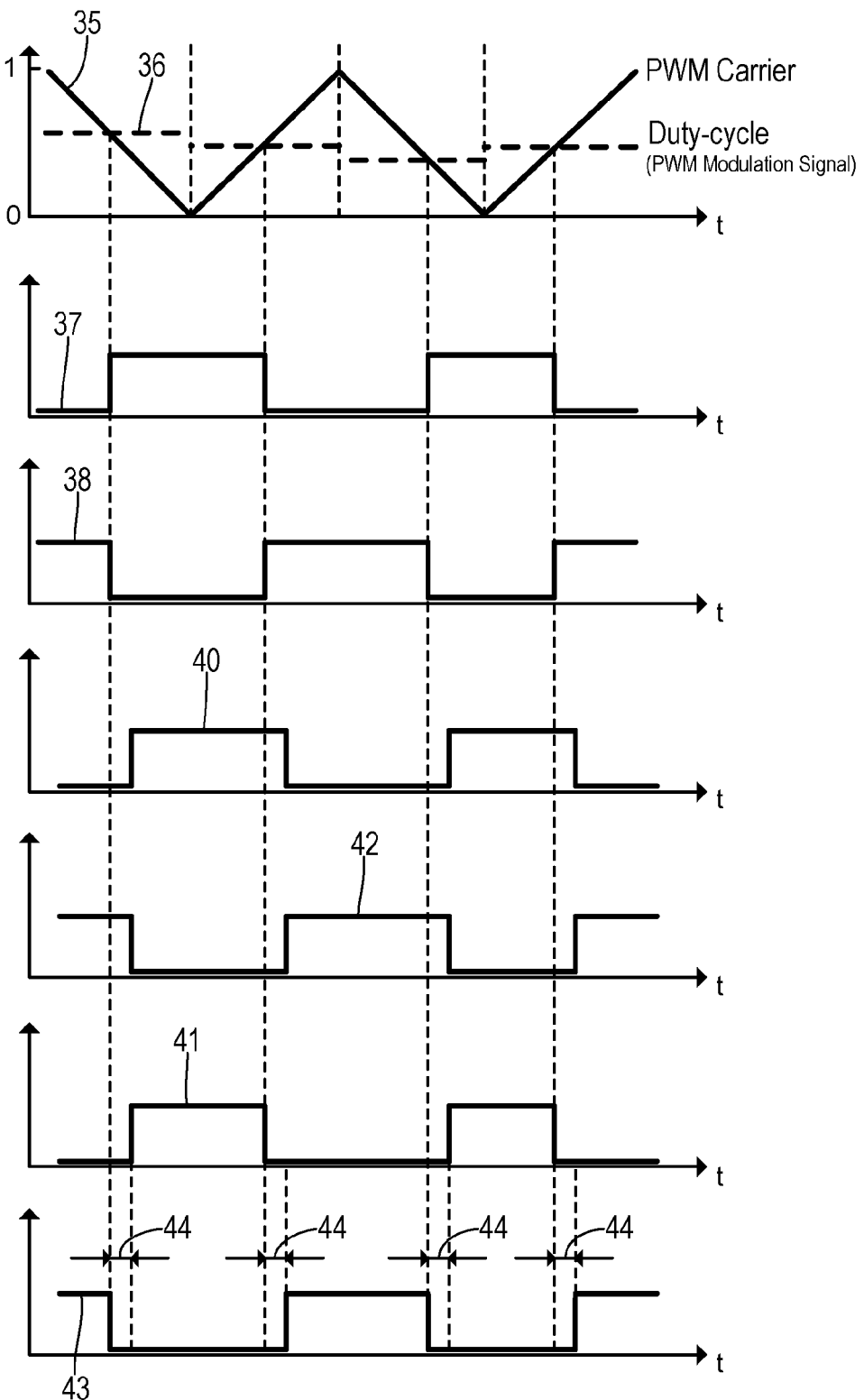
FIG. 2 is a waveform diagram showing the generation of gate signals with and without an inserted dead-time.

FIG. 2 shows a PWM carrier signal 35 which is generated as a triangular waveform at a high frequency (e.g., around 5 kHz) as compared to the rotation frequency of the motor. Using a known PWM method for generating gate-drive switching signals based on current-control, a PWM duty-cycle signal 36 is generated in response to an error between detected current and a target current. Duty-cycle 36 is compared with PWM carrier signal 35 to generate the PWM signals according to a progression of signals shown below in FIG. 2. A signal 37 is an original upper device gate signal $G_{UO}$ (i.e., a nominal gate signal with no dead time insertion) which has a low logic level when PWM carrier signal 35 is greater than duty cycle signal 36 and which has a high logic level when duty cycle signal 36 is greater than PWM carrier signal 35. A signal 38 shows an original (nominal) lower device gate signal $G_{LO}$ which is the logical inverse of $G_{UO}$ signal 37. These original gate signals can be generated other than by use of a PWM carrier signal, such as by direct numerical calculation.

To avoid shoot-through that could occur using original gate signals 37 and 38, a conventional dead-time insertion has been performed as follows. A waveform 40 is obtained by introducing a time delay (e.g., a fixed dead-time delay $t_D$) into signal 37. The fixed time delay represents a sufficiently long dead-time insertion that avoids simultaneous activation of both upper and lower switching devices that could occur as a result of noise or propagation delay differences between the upper and lower gate signals (typically having a duration of several microseconds). A dead-time-inserted upper switching device gate signal ($G_{UDI}$) 41 is obtained by AND-gating (i.e., forming a logical AND) of original gate signal 37 and delayed gate signal 40. A signal 42 shows a time delayed version of lower gate signal 38 using the same fixed delay $t_D$. A dead-time-inserted lower switching device gate signal ($G_{LDI}$) 43 is generated as a logical AND of original lower device gate signal 38 and delayed signal 42.

In the prior art, dead-time inserted upper and lower gate signals 41 and 43 ($G_{UDI}$ and $G_{LDI}$), respectively, have been used to drive the phase leg switching devices under all conditions (i.e., with a dead-time 44 being inserted at every switching event) wherein each positive transition of a switching device turning on has been delayed while each negative transition of a switching device turning off is unchanged.

The original, nominal PWM switching signals (prior to dead-time insertion) operates by providing a phase voltage v intended to achieve a target current i as follows:

$$i(t) = \frac{1}{L}\int_{t0}^{t} v \cdot dt + i(t0)$$

where L is the phase inductance. The integral has the unit of volt-second. Dead-time insertion creates either missing or extra volt-seconds (depending on current direction) which creates the current distortion. Various techniques have been employed to attempt to compensate the PWM-generated signals to take into account the missing or extra volt-second introduced by the dead-time insertion so that the load current distortion is reduced. However, additional hardware capabilities have been required, and compensation has not been completely effective.

In commonly assigned U.S. application Ser. No. 14/601,300, the introduction of distortion as a result of dead-time insertion can be reduced by inserting a dead time in a way which does not change the volt-seconds of the switching device actively carrying an output current. More particularly, a generally sinusoidal flow of current i in a particular phase leg has a positive direction when flowing from the phase leg junction into a motor phase winding and a negative direction when flowing from the winding to the junction. During times when the phase current is positive, then commutations are occurring between an active upper switching device and a passive lower switching device. In other words, even though both switching devices are alternately activated, only the active upper device is turned on while the lower active device carries no current even when turned on because the current direction is against it. Similarly, when the phase current is negative, commutations occur between a passive upper device and active lower device.

When the detected current direction is positive, then the upper gate signal has a turn-on time and a turn-off time each shifted by a predetermined offset (e.g., equal to a dead-time $t_D$) with respect to the nominal gate signals. Since they are shifted equally there is no deviation of the total volt-seconds delivered by the active upper switching device. The lower gate signal has an added dead-time which is created by delaying its turn-on time with respect to a corresponding turn-off time of the upper gate signal and advancing its turn-off time with respect to a corresponding turn-on time of the upper gate signal. Since the lower switching device is passive, the dead-time insertion is accomplished with reduced distortion.

When the detected current direction is negative, then the lower gate signal has a turn-on time and a turn-off time each shifted by the predetermined offset (e.g., equal to a dead-time $t_D$) with respect to the nominal gate signals. Since they are shifted equally there is no deviation of the total volt-seconds delivered by the active lower switching device. The upper gate signal is generated with an added dead-time which is created by delaying its turn-on time with respect to a corresponding turn-off time of the lower gate signal and advancing its turn-off time with respect to a corresponding turn-on time of the lower gate signal. Since the upper switching device is passive in this case, the dead-time insertion is accomplished with reduced distortion.

Figure 3:
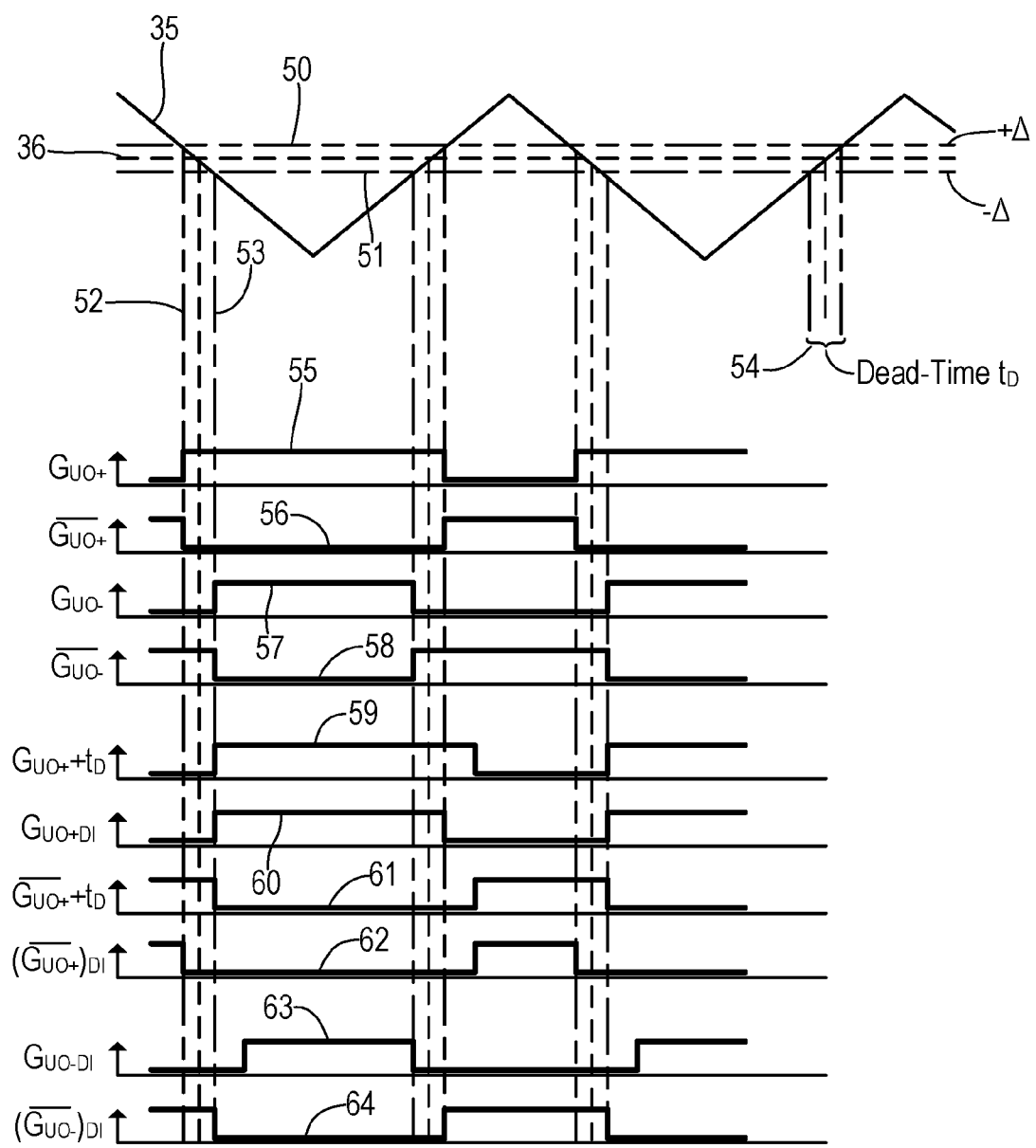
FIG. 3 is a waveform diagram showing an alternate method of generating a dead-time.

FIG. 3 shows signal waveforms according to a method of U.S. application Ser. No. 14/601,300 for generating pre-compensated dead-time inserted gate signals. In this method, the PWM carrier signal is compared with offset duty cycle signals instead of with the nominal value of the conventionally-obtained variable duty cycle. Thus, current feedback is used to determine the nominal target value of duty cycle signal 36 in a known manner. A "+Δ" or "positive-offset" duty cycle signal 50 is obtained by adding a predetermined offset to duty cycle signal 36. A "−Δ" or "negative-offset" duty cycle signal 51 is obtained by subtracting the predetermined offset from duty cycle signal 36. PWM carrier signal 35 has a predetermined slope. In view of the slope and the difference between the positive-offset and negative-offset duty cycles (which is equal to two times the predetermined offset), a dead-time window 54 defines a time interval equal to the desired dead-time $t_D$. Dead-time window 54 is centered upon the nominal switch transition time without dead-time insertion.

Based on the comparisons using the positive-offset duty cycle and the negative-offset duty cycle, separate pairs of dead-time inserted gate signals are derived for use when current direction is positive or negative as follows. Comparison of the PWM carrier with a positive-offset duty cycle produces an upper original positive-offset gate signal $G_{UO+}$ shown as a waveform 55. For the purpose of producing a corresponding gate signal for the lower switching device, the upper gate signal is inverted to provide a signal $\overline{G_{UO+}}$ shown as a waveform 56. Gate signals $G_{UO+}$ and $\overline{G_{UO+}}$ are pre-compensated signals providing the basis for forming dead-time inserted gate signals to be used when the current direction is positive.

Comparison of the PWM carrier with a negative-offset duty cycle produces an upper original negative-offset gate signal $G_{UO-}$ shown as a waveform 57. For the purpose of producing a corresponding gate signal for the lower switching device, the upper gate signal is inverted to provide a signal $\overline{G_{UO-}}$ shown as a waveform 58. Gate signals $G_{UO-}$ and $\overline{G_{UO-}}$ are pre-compensated signals providing the basis for forming dead-time inserted gate signals to be used when the current direction is negative.

The pre-compensated signals are modified to introduce dead-time intervals using the delaying and AND-gating process. Thus, the upper original positive-offset gate signal $G_{UO+}$ is delayed by dead-time $t_D$ to produce a delayed signal shown as a waveform 59. AND-gating of waveform 59 with undelayed waveform 55 produces an upper dead-time-inserted positive-offset gate signal $G_{UO+DI}$ shown as waveform 60. For the lower gate signal, inverted waveform $\overline{G_{UO+}}$ is delayed in order to generate a waveform 61 which is ANDed with waveform 56 to produce a lower dead-time-inserted positive-offset gate signal $(\overline{G_{UO+}})_{DI}$ shown as a waveform 62. The positive-offset duty cycle corresponds to a positive load current, so that when load current is positive, waveforms 60 and 62 (corresponding to $G_{UO+DI}$ and $(\overline{G_{UO+}})_{DI}$, respectively) are selected as the gate drive signals $G_U$ and $G_L$.

For a negative load current, the negative-offset duty cycle is used for generating the gate drive signals. Thus, upper original negative-offset gate signal $G_{UO-}$ is delayed, and then the delayed and undelayed signals are AND-gated to produce an upper dead-time-inserted negative-offset gate signal $G_{UO-DI}$ shown as waveform 63. Inverted waveform $\overline{G_{UO-}}$ is delayed, and then the delayed and undelayed signals are AND-gated to produce a lower dead-time-inserted negative-offset gate signal $(\overline{G_{UO-}})_{DI}$, shown as a waveform 64.

Figure 4:
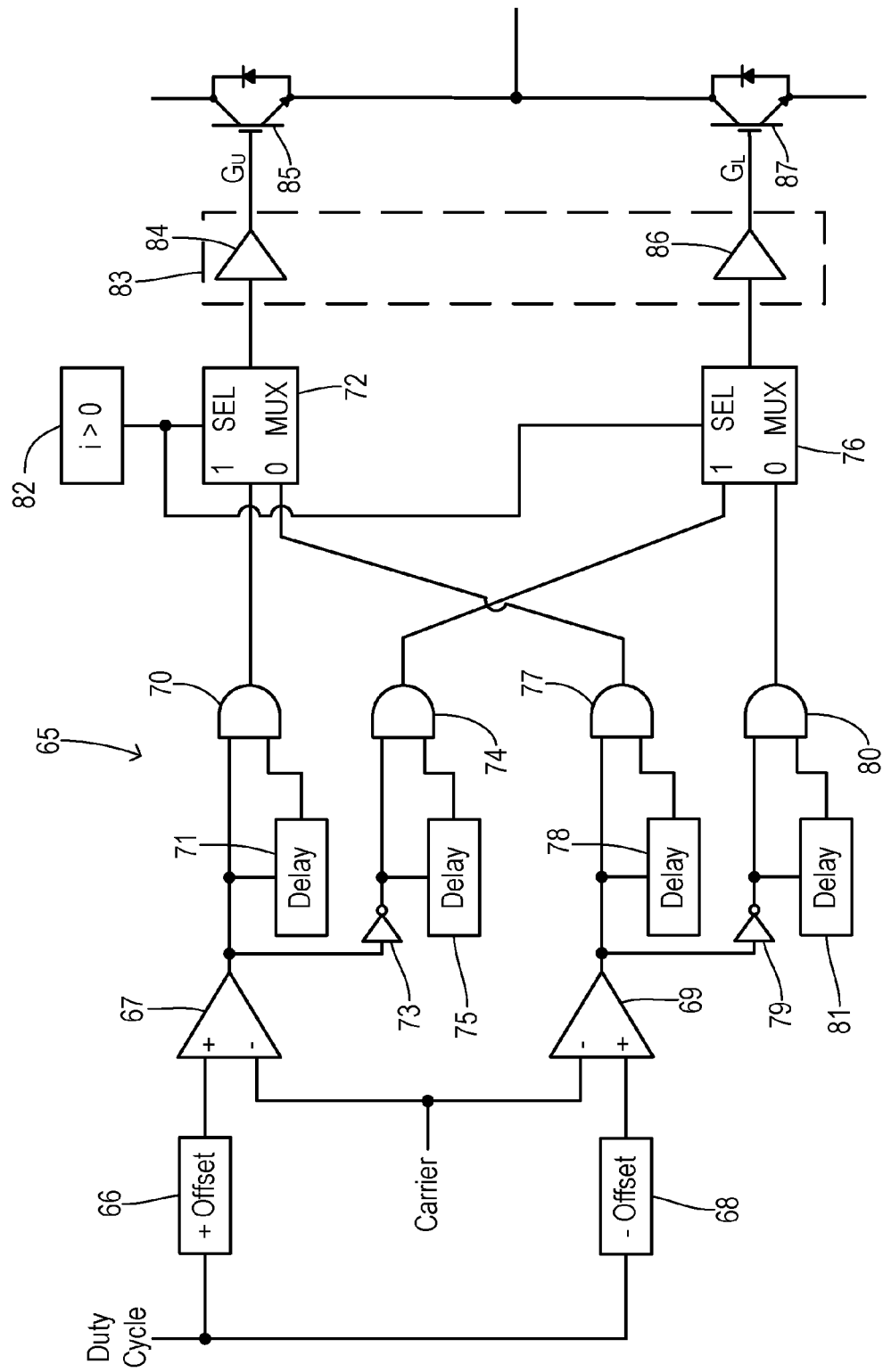
FIG. 4 is a schematic, block diagram for generating gate signals according to FIG. 3.

FIG. 4 shows a logic circuit 65 for generating gate signals as shown in FIG. 3. Logic circuit 65 may include dedicated electronic circuit components as shown or may be implemented using a programmable controller such as a microcontroller. A PWM duty cycle command (e.g., generated using conventional PWM control methods) is increased in an adder 66 by a predetermined offset. The magnitude of the offset corresponds to one-half of the desired dead-time interval, and further depends on the slope of the PWM carrier signal. More specifically, the difference between the positive-offset duty cycle and the negative-offset duty cycle (i.e., twice the size of the predetermined offset) divided by the slope should be equal to the desired dead-time interval $t_D$.

The positive-offset duty cycle from adder 66 is coupled to a noninverting input of a comparator 67. The PWM carrier signal is coupled to an inverting input of comparator 67. In response to the comparison, comparator 67 outputs an original upper gate drive signal $G_{UO+}$ to a first input of an AND-gate 70. In a similar manner, a negative-offset duty cycle formed by an adder 68 that subtracts the predetermined offset from the commanded duty cycle is coupled to a noninverting input of a comparator 69. Comparator 69 outputs an original upper gate drive signal $G_{UO-}$ to a first input of an AND-gate 77 by comparing the negative-offset duty cycle with the PWM carrier signal which it receives at its inverting input.

The output of comparator 67 is delayed by a dead-time interval $t_D$ in a delay block 71 for providing a second input to AND-gate 70. The output of AND-gate 70 corresponds to the $G_{UO+DI}$ signal, and it is coupled to a first input of a multiplexer 72. The input is a one-selected input which passes through multiplexer 72 when a high logic level (binary "1") signal is present at a Select input (SEL) of multiplexer 72.

The output of comparator 67 is inverted by an inverter 73 to provide an original pre-compensated lower gate drive signal which is coupled to one input of an AND-gate 74. The output of inverter 73 is delayed by the dead-time interval $t_D$ in a delay block 75 for providing to a second input of AND-gate 74. The output of AND-gate 74 corresponds to the $(\overline{G_{UO+}})_{DI}$ signal, and it is coupled to a first input of a multiplexer 76. The input is a one-selected input which passes through multiplexer 76 when a high logic level (binary "1") signal is present at a Select input (SEL) of multiplexer 76.

The output of comparator 69 is delayed by dead-time interval $t_D$ in a delay block 78 for providing a second input to AND-gate 77. The output of AND-gate 77 corresponds to the $G_{UO-DI}$ signal, and it is coupled to a second input of multiplexer 72. The input is a zero-selected input which passes through multiplexer 72 when a low logic level (binary "0") signal is present at the Select input (SEL) of multiplexer 72.

The output of comparator 69 is inverted by an inverter 79 to provide an original pre-compensated lower gate drive signal which is coupled to one input of an AND-gate 80. The output of inverter 79 is delayed by the dead-time interval $t_D$ in a delay block 81 for providing to a second input of AND-gate 80. The output of AND-gate 80 corresponds to the $(\overline{G_{UO-}})_{DI}$ signal, and it is coupled to a second input of multiplexer 76. The input is a zero-selected input which passes through multiplexer 76 when a low logic level (binary "0") signal is present at the Select input (SEL) of multiplexer 76.

A comparison block 82 compares a detected value of the instantaneous current flowing in the corresponding phase to zero, in order to determine a positive or negative direction of current flow from the phase leg to the load. When the direction is positive, block 82 provides a high logic level to the SEL inputs of multiplexers 72 and 76. Otherwise, a negative current causes block 82 to provide a low logic level to the SEL inputs of multiplexers 72 and 76. Consequently, the appropriate pair of dead-time-inserted gate signals are applied to the inputs of amplifiers 84 and 86 in a driver 83, and phase leg switching devices 85 and 87 operate with a desired dead-time while reducing current distortion. Due to noise and other fluctuations, the determination of the direction of current flow is subject to errors when the current magnitude is close to zero. To avoid shoot-through under this condition, a dead time continues to be inserted in both the upper and lower gate signals. Thus, there is still some distortion since the nominal gate signals are not used in an unmodified form.

Figure 5:
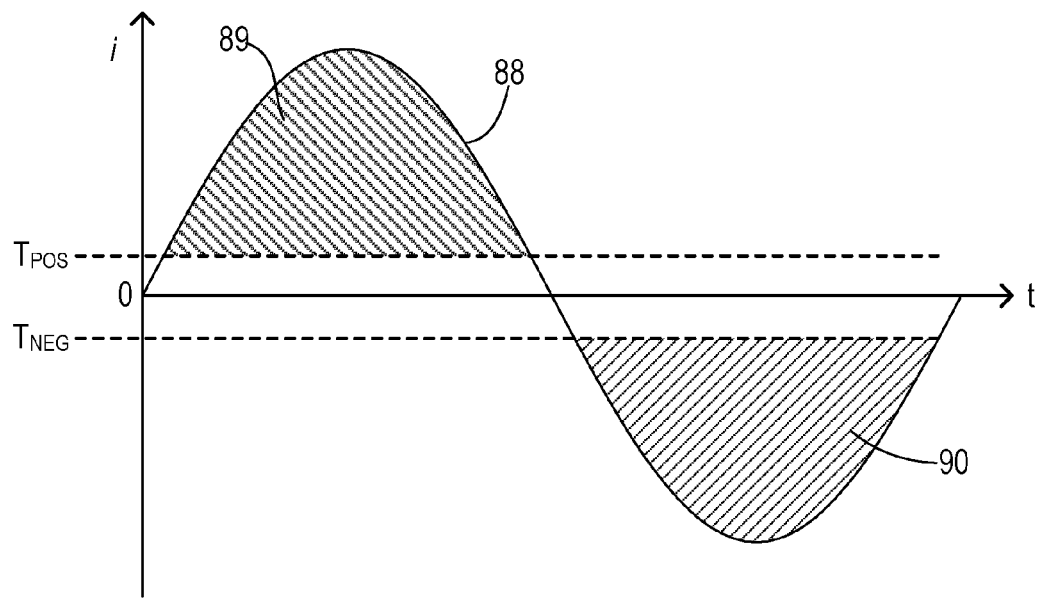
FIG. 5 is a graph showing current magnitude from a phase leg during PWM operation together with thresholds for detecting positive and negative current flows.
Figure 6:
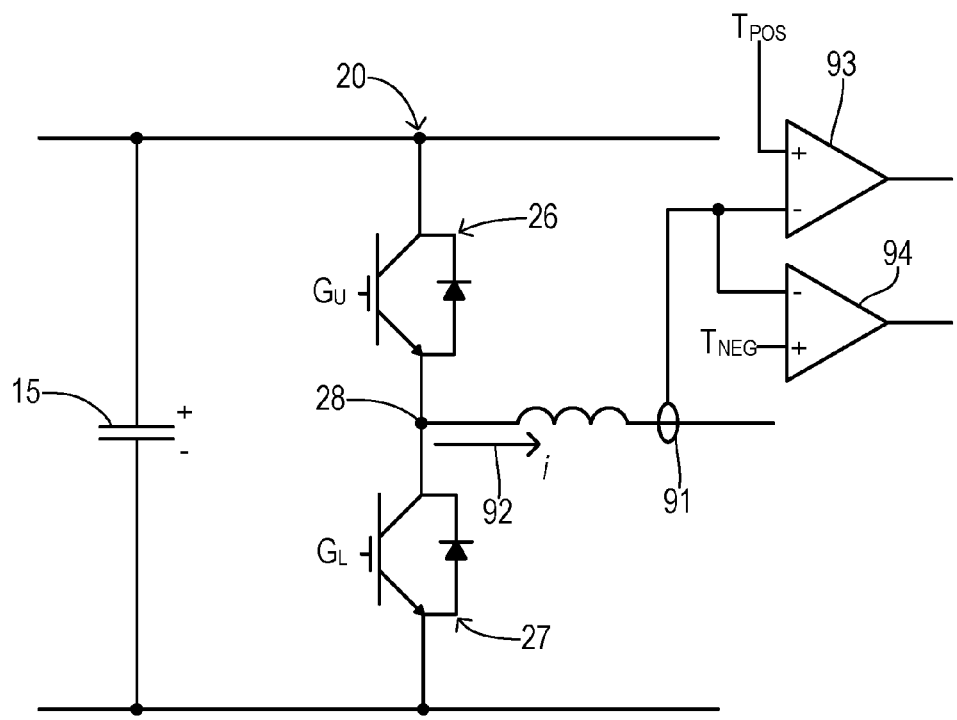
FIG. 6 is a schematic diagram of a phase leg and a comparator circuit for detecting the positive or negative current flows of FIG. 5.

As disclosed in commonly assigned U.S. application Ser. No. 14/601,282, when the current magnitude is sufficiently far from zero then it may be possible to use a nominal gate signal for one of the switches. FIG. 5 shows a phase current 88 for any one of the phase windings, which varies at a frequency corresponding to motor speed. This frequency is lower than the PWM switching frequency in general. There is a high current region 89 when phase current is greater than a positive threshold $T_{Pos}$ and a low current region 90 when phase current is less than a negative threshold $T_{Neg}$. During times when the phase current is sufficiently positive (i.e., above $T_{Pos}$ in region 89), then switching device commutations for that phase leg are reliably occurring between an active upper switching device and a passive lower switching device, for example. In order to detect the condition in which the phase current is sufficiently far from zero (in order to avoid noise-induced errors in selecting appropriate gate signals), additional comparators are required as shown in FIG. 6. Thus, a current sensor 91 has an output coupled to an inverting input of a comparator 93 and an inverting input of a comparator 94. A positive threshold $T_{POS}$ is coupled to a noninverting input of comparator 93, and a negative threshold $T_{NEG}$ is coupled to a noninverting input of comparator 94.

Figure 7:
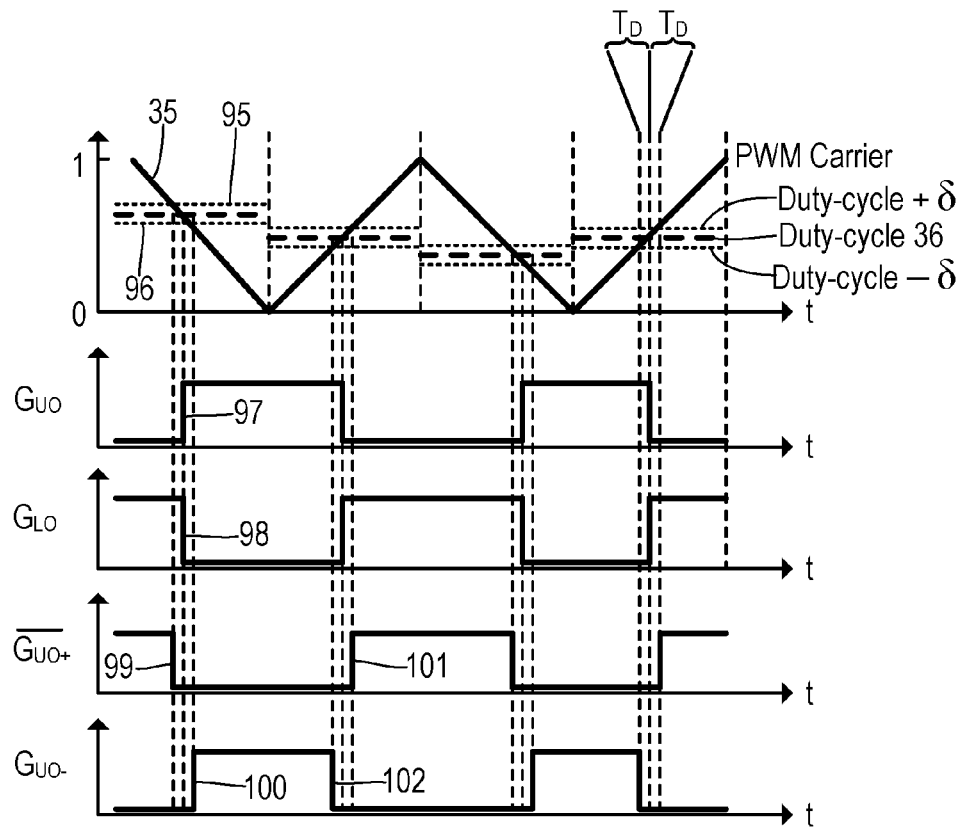
FIG. 7 is a waveform diagram showing the generation of gate signals with dead-time insertion according to the present invention.

The present invention eliminates the need for the above "uncertain" band between the positive and negative thresholds while enabling the use of the nominal (unmodified) gate signal for the active phase switch, particularly during times of significant current flow so that distortion is avoided. Since the uncertain band is not used, the associated comparators are no longer necessary. FIG. 7 illustrates a preferred embodiment. Offset duty cycles 95 and 96 are obtained by adding and subtracting a fixed offset (denoted δ) from duty cycle signal 35, and the offset values are used for comparison with the PWM carrier when generating the gate drive signals. Thus, the original (nominal) upper and lower gate drive signals $G_{UO}$ and $G_{LO}$ are obtained in the usual way based on comparing duty cycle 36 with PWM carrier 35, which provides transitions 97 and 98 for the original signals. For generating the dead-time inserted signals, PWM carrier signal 35 is compared with the offset duty cycles as follows. To generate the lower gate dead-time inserted drive signal, PWM carrier 35 is compared with positive offset duty cycle 95 (i.e., commanded duty cycle+δ) and the result of the comparison is inverted. Thus, the lower gate drive signal with dead-time insertion is obtained as an inverted upper gate drive signal $\overline{G_{UO+}}$ obtained from positive offset duty cycle 95. As shown in FIG. 7, signal $\overline{G_{UO+}}$ has transitions 99 and 101 coincident with the crossings of PWM carrier 35 with positive offset duty cycle 95. To generate an upper dead-time inserted gate drive signal, the negative offset duty cycle 96 is used. Transitions 100 and 102 are shown for this signal which is also denoted $Q_{UO-}$ since it is generated using the negative offset. Thus, by employing offsets to the duty cycle, changes in transition times for the gate drive signals are obtained which provide the dead-time intervals.

Unlike the embodiment of FIGS. 3 and 4 wherein duty cycle offset Δ is one-half of dead time $t_D$, the size of each offset in the present invention corresponds with the full dead time (i.e., δ=$t_D$). In other words, based on the slope of the PWM carrier signal, the change in signal magnitude of PWM carrier signal 35 between original PWM duty cycle 36 and positive offset duty cycle 95 corresponds with a time period equal to desired dead-time $t_D$. The same is true for negative offset duty cycle 96. Consequently, the signals $G_{UO}$, $G_{LO}$, $\overline{G_{UO+}}$, and $Q_{UO-}$ are all the signals needed to for adapting the gate signals to provide the desired performance.

Figure 8:
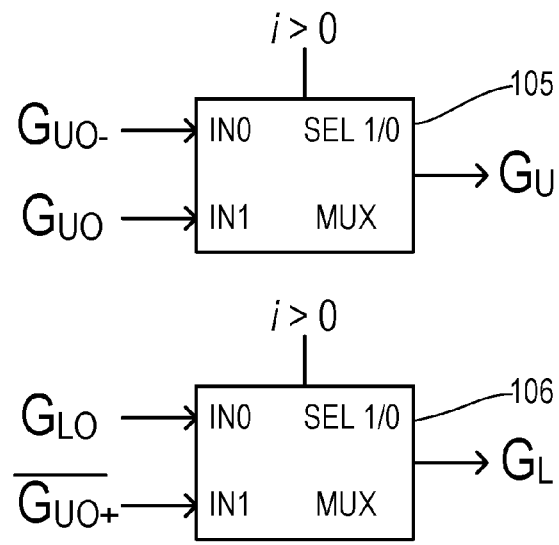
FIG. 8 is a block diagram showing multiplexers arranged to select gate signals according to the present invention.

The $G_{UO}$, $G_{LO}$, $\overline{G_{UO+}}$, and $Q_{UO-}$ signals are input to respective multiplexers 105 and 106 in FIG. 8 for selecting the original or dead time inserted signals according to whether the current sensor for the phase leg detects a positive or a negative direction of current flow from the corresponding phase leg junction to the load.

What is claimed is:

1. A power converter comprising:
   a phase leg comprising an upper switching device and a lower switching device, wherein a junction between the upper and lower switching devices is configured to be coupled to a load;
   a current sensor for the phase leg detecting a positive or negative direction of a current flow from the junction to the load; and
   a gate driver coupled to the phase leg activating the upper switching device according to an upper gate signal and activating the lower switching device according to a lower gate signal; and
   a controller comparing a PWM carrier signal to a commanded duty cycle signal to generate nominal upper and lower timing signals, wherein when the positive direction of current flow is detected then the controller:
      generates a positive offset duty cycle which is greater than the commanded duty cycle by a predetermined positive offset;
      compares the PWM carrier signal to the positive offset duty cycle signal to generate a positive offset timing signal;
      generates the upper gate signal according to the nominal upper timing signal; and
      generates the lower gate signal according to the logical inverse of the positive offset timing signal;
   and wherein when the negative direction of current flow is detected then the controller:
      generates a negative offset duty cycle which is less than the commanded duty cycle by a predetermined negative offset;
      compares the PWM carrier signal to the negative offset duty cycle signal to generate a negative offset timing signal;
      generates the upper gate signal according to the negative offset timing signal; and
      generates the lower gate signal according to the nominal lower timing signal.

2. The power converter of claim 1 wherein the PWM carrier signal has a predetermined slope, wherein the predetermined positive offset divided by the predetermined slope is equal to a predetermined dead-time $t_D$, and wherein the predetermined negative offset divided by the predetermined slope is equal to the predetermined dead-time $t_D$.

3. The power converter of claim 2 wherein the PWM carrier signal is comprised of a triangle waveform.

4. The power converter of claim 1 wherein the load is comprised of an electric traction motor for a road vehicle, and wherein the commanded duty cycle corresponds to a desired torque from the traction motor.

5. A power conversion method comprising:
generating PWM upper and lower gate signals for driving a phase leg;
detecting a current direction from the leg;
when the direction is positive, driving the leg with delayed rising and advanced falling edges of the lower gate signal and unmodified upper gate signal; and
when the direction is negative, driving the leg with delayed rising and advanced falling edges of the upper gate signal and unmodified lower gate signal.

6. The method of claim 5 wherein the step of advancing and delaying edges of the lower gate signals is comprised of:
comparing a PWM carrier signal to a commanded duty cycle signal to generate nominal upper and lower timing signals;
generating a positive offset duty cycle which is greater than the commanded duty cycle by a predetermined positive offset;
comparing the PWM carrier signal to positive offset duty cycle signal to generate a positive offset timing signal;
generating the upper gate signal according to the nominal upper timing signal; and
generating the lower gate signal according to the logical inverse of the positive offset timing signal.

7. The method of claim 6 wherein the step of advancing and delaying edges of the upper gate signals is comprised of:
generating a negative offset duty cycle which is less than the commanded duty cycle by a predetermined negative offset;
comparing the PWM carrier signal to negative offset duty cycle signal to generate a negative offset timing signal;
generating the lower gate signal according to the nominal lower timing signal; and
generating the upper gate signal according to the negative offset timing signal.

8. The method of claim 7 wherein the PWM carrier signal has a predetermined slope, wherein the predetermined positive offset divided by the predetermined slope is equal to a predetermined dead-time $t_D$, and wherein the predetermined negative offset divided by the predetermined slope is equal to the predetermined dead-time $t_D$.

9. An electric drive for a transportation vehicle comprising:
a multi-phase electric traction motor;
a DC link configured to receive a DC supply voltage;
a plurality of phase legs coupled between the DC link and the motor, wherein each phase leg comprises:
a respective upper switching device and a respective lower switching device, wherein a junction between the upper and lower switching devices is coupled to the motor;
a current sensor for the phase leg detecting a positive or negative direction of a current flow from the junction to the load; and
a gate driver coupled to the phase leg activating the upper switching device according to an upper gate signal and activating the lower switching device according to a lower gate signal; and
a controller comparing a PWM carrier signal to a commanded duty cycle signal to generate respective nominal upper and lower timing signals, wherein when a respective positive direction of current flow is detected then the controller:
generates a respective positive offset duty cycle which is greater than the commanded duty cycle by a predetermined positive offset;
compares the PWM carrier signal to the respective positive offset duty cycle signal to generate a respective positive offset timing signal;
generates the respective upper gate signal according to the respective nominal upper timing signal; and
generates the respective lower gate signal according to the logical inverse of the respective positive offset timing signal;
and wherein when a respective negative direction of current flow is detected then the controller:
generates a respective negative offset duty cycle which is less than the commanded duty cycle by a predetermined negative offset;
compares the PWM carrier signal to the respective negative offset duty cycle signal to generate a respective negative offset timing signal;
generates the respective upper gate signal according to the respective negative offset timing signal; and
generates the respective lower gate signal according to the respective nominal lower timing signal.

10. The electric drive of claim 9 wherein the PWM carrier signal has a predetermined slope, wherein the predetermined positive offset divided by the predetermined slope is equal to a predetermined dead-time $t_D$, and wherein the predetermined negative offset divided by the predetermined slope is equal to the predetermined dead-time $t_D$.

11. The electric drive of claim 10 wherein the PWM carrier signal is comprised of a triangle waveform.

* * * * *